United States Patent
Hansen

(10) Patent No.: US 7,499,449 B2
(45) Date of Patent: Mar. 3, 2009

(54) VIRTUAL ETHERNET MAC SWITCHING

(75) Inventor: Per Flemming Hansen, Søborg (DK)

(73) Assignee: Tpack A/S, Herlev (DK)

( * ) Notice: Subject to any disclaimer, the term of this patent is extended or adjusted under 35 U.S.C. 154(b) by 621 days.

(21) Appl. No.: 11/122,981

(22) Filed: May 5, 2005

(65) Prior Publication Data

US 2005/0238001 A1     Oct. 27, 2005

Related U.S. Application Data

(63) Continuation of application No. PCT/DK03/00762, filed on Nov. 7, 2003.

(60) Provisional application No. 60/473,934, filed on May 28, 2003.

(30) Foreign Application Priority Data

Nov. 7, 2002   (DK) ................................ 2002 01707

(51) Int. Cl.
   *H04L 12/28* (2006.01)
(52) U.S. Cl. ...................... 370/389; 370/401; 370/392; 370/907
(58) Field of Classification Search ........................ None
   See application file for complete search history.

(56) References Cited

U.S. PATENT DOCUMENTS

2002/0085543 A1   7/2002   O'Connor
2002/0085567 A1   7/2002   Chattopadhya et al.

OTHER PUBLICATIONS

H. Epstein, et al., Managing optical networks, Bell labs tech. J. (Jan.-Jun. 2001), pp. 50-66, Lucent Tech., vol. 6, No. 1, XP002223757, 1089-7089.
Banerjee, et al., Generalized multiprotocol label switching, an overview, IEEE Communications Mag., Jan. 2001, Internet Tech Series, pp. 144-150, US, vol. 39, No. 1.
Tellabs, Choosing the Best of Today's Ethernet-over-SDH Standard, Oct. 2003, pp. 21-25, 31-32, Published in: Internet.

*Primary Examiner*—Duc C Ho
(74) *Attorney, Agent, or Firm*—MaxValueIP, LLC

(57) ABSTRACT

A method of sending an information package from a first to a second data network employs a communications network including a plurality of access points, a plurality of MPLS switches, a plurality of paths defined from each access point to an Ethernet switch including MPLS switching capabilities via at least one of the MPLS switches, and a plurality of paths from the Ethernet switch to each access point via an MPLS switch. The information package is received at an access point, and a header including a MPLS label is added to it. The information package including the header is sent to the Ethernet switch via a path from an access point. Switching and sending the information package to a further access point corresponding to the second data network removes the header from the information package, and sends the information package from the further access point to the second data network.

7 Claims, 1 Drawing Sheet

VIRTUAL ETHERNET MAC SWITCHING

CROSS-REFERENCE TO RELATED APPLICATIONS

This application is a Continuation of co-pending International Application No. PCT/DK2003/00762, filed 7 Nov. 2003, which claims the benefit, under 35 U.S.C. §119(e), of U.S. Provisional Application No. 60/473,934, filed 28 May 2003. The disclosures of the aforesaid International Application and U.S. Provisional Application are expressly incorporated herein by reference.

BACKGROUND OF THE INVENTION

The present invention relates generally to computer or data networks and communication systems, and more specifically to a method for sending an information package from one computer or data network to another computer or data network through a communication network such as an SDH or SONET network, including a virtual ethernet mac switching.

Technology relevant to the present invention has been described in publications such as U.S. Pat. No. 2002/0138628, U.S. Pat. No. 2002/0146026, U.S. Pat. No. 2002/0138628, U.S. Pat. No. 2002/0085543 and GB 2,375,023. Reference is made to the above mentioned patents and the U.S. publications and are hereby incorporated by reference.

Computer networks in companies or large corporations having more than one physical location are often required to exchange information. This exchange of information may be carried out by use of computer networks communicating by using data links through networks such as telephone networks or data networks. These links may be obtained by means of wireless connections, either optical or microwave, especially if the locations are in close vicinity, alternatively a dedicated line, such as a telephone line or data line, may be used, further alternatively a connection via a service provider may be used to obtain the connection between company local area networks.

Presently the communications protocol predominantly used in Local Area Networks (LAN) is Ethernet. Ethernet is specified in IEEE 802.3.

The Internet Engineering Task Force (IETF) have defined a protocol named Multiprotocol Label Switching (MPLS). By definition, MPLS supports multiple protocols. At the Network Layer MPLS supports IPv6, IPv4, IPX and AppleTalk. At the Link Layer MPLS supports Ethernet, Token Ring, FDDI, ATM, Frame Relay, and Point-to-Point Links. It can essentially work with any control protocol other than IP and layer on top of any link layer protocol.

SUMMARY OF THE INVENTION

The present invention provides a method of sending an information package from a first data network to at least one second data network through a communications network, in particular a SDH or SONET network, the communication network comprising a first plurality of access points and a second plurality of MPLS switches, a third plurality of paths defined from each of the access points to an Ethernet switch including MPLS switching capabilities via at least one of the MPLS switches of the second plurality, a fourth plurality of paths defined from the Ethernet switch including MPLS switching capabilities to each of the access points via at least one of the MPLS switches of the second plurality, the method comprises:

sending the information package from the first network to a specific access point of the first plurality, receiving the information package at the specific access point and adding a header to the information package, the header including an MPLS label, sending the information package including the header from the specific access point to the Ethernet switch including MPLS switching capabilities via a path of the third plurality, the Ethernet switch including MPLS switching capabilities switching the information package including the header to at least one of the paths of the fourth plurality, receiving the information package including the header at at least one further specific access point corresponding to the at least one second data network, removing the header from the information package, and sending the information package from the at least one further specific access point to the at least one second data network.

The Ethernet switch including MPLS switching capabilities enables a network operator to offer customers their own private label switch path through the network while the operator is able to utilize the physical connection during the periods where the traffic does not congest and/or bandwidth is still available, to multiplex traffic from several clients or customers without the need to invest in additional physical links for the separation of private traffic.

In the presently preferred embodiment of the present invention the information package being sent is an Ethernet package since the most common data networks are Ethernet based. Also the first and/or the second data network may both be Ethernet networks. Alternatively the information package and/or first and/or second data network may be based on any data structure or data protocol.

According to the present invention the information package may include an Ethernet VLAN field, and the Ethernet switch including MPLS switching capabilities may read the VLAN field for deciding where to forward the information packages based on a combination of an Ethernet destination MAC lookup and the information in the VLAN field.

The Ethernet switch including MPLS switching capabilities according to the present invention may further include software or hardware implementations of policing, shaping and/or read methods according to IETF specifications. This enables the Ethernet switch including MPLS switching capabilities to engineer the traffic going through the switch in a way such that the individual customer or client may be guaranteed a minimum bandwidth, a minimum QoS and other advantages.

In an MPLS network, a Label Edge Router (LER) assigns a label to incoming packets. A label is a short, fixed length, locally significant identifier that is used to identify a Forwarding Equivalence Class (FEC). FEC is a set of packets that will be forwarded in the same manner (e.g., over the same path with the same forwarding treatment). Typically packets belonging to the same FEC will follow the same path in the MPLS domain. While assigning a packet to an FEC the ingress LSR may look at the IP header and also some other information such as the interface on which this packet arrived. A label identifies the FEC to which a packet is assigned.

The label, which is put on a particular packet, represents the FEC to which that packet is assigned. At the simplest level, a label may be thought of, as nothing more than shorthand for the packet header, in order to index the forwarding decisions that a router would make for the packet. In this context, the label is nothing more than shorthand for an aggregate stream of user data. Packets are forwarded along a Label Switch Path (LSP) where each Label Switch Router (LSR) makes forwarding decisions based solely on the contents of the label. At each hop, the LSR strips off the existing label and applies a new label, which tells the next hop how to forward the packet.

A Label Switch Path (LSPs) is a specific path traffic path through an MPLS network. LSPs are established by network operators for a variety of purposes, such as to guarantee a certain level of performance, to route around network congestion, or to create IP tunnels for network-based virtual private networks (VPNs). In many ways, LSPs are no different than circuit-switched paths in Asynchronous Transfer Mode (ATM) or Frame Relay networks, except that they are not dependent on a particular Layer 2 technology. ATM is a networking technology defined by the International Telecommunication Union (ITU).

An LSP that crosses multiple Layer 2 transports, such as ATM, Frame Relay or Ethernet, can be established. Thus, one of the true promises of MPLS is the ability to create end-to-end circuits, with specific performance characteristics, across any type of transport medium, eliminating the need for overlay networks or Layer 2 only control mechanisms.

Ordinary Ethernet Local Area Network switches are able to switch or forward Ethernet packages between physical Ethernet gates and Virtual Local Area Network (VLAN) gates, presently these Ethernet switches usually have 24 to 32 gates. These Ethernet switches are present in many companies and connect various types of computers in LANs. A Company may have one or more physical locations, all having computers connected in networks, and these networks may in some way be interconnected.

An Ethernet data package includes a destination and a source Ethernet Media Access Control (MAC) address and may also include a VLAN field. Ethernet MAC addresses are 48 bits long and VLAN fields are 12 bits long. In an ordinary Ethernet LAN switch, the decision on forwarding packages is decided by an Ethernet destination MAC address lookup and may be combined with the VLAN field. The VLAN field may defined as much as 4096 different virtual Ethernet switches whereby a company using VLAN can divide their Ethernet structure in separate logical Ethernets. The physical Ethernet connection may connect units using the same VLAN, however, the Ethernet protocol does not allow two units on different Ethernet VLANs to exchange packages, even if they are connected via the same physical Ethernet segment. For this purpose, an IP-router is used to route Ethernet packages between one or more Ethernet VLANs.

Ethernet is presently the most common communication technology used for computer networks. Ethernet is a very common technology used in computer networks in private corporations, and service providers are contemplating to offer global Ethernet switching services for private companies. Ethernet traffic comprises short bursts of traffic with long periods of inactivity, enabling a service such as global virtual Ethernet switching, provided the service provider multiplexes the traffic from several customers into the same communication lines, thereby achieving a better utilization of capacities. Statistical packet multiplexing is known and used by many service providers in their ATM networks.

A global Ethernet switch service must separate the traffic of different companies, as they may potentially use the same Ethernet MAC addresses and/or VLAN addresses. Global Ethernet switch service requires a virtual Ethernet MAC switch that operates as a virtual Ethernet MAC switch for each customer. VLAN may be used but does not scale to a global level only having 4096 possible VLAN addresses, limiting the individual companies' uses of VLAN. In the present context global may be interpreted as a larger area, e.g. a state, a county, an island, a country, a continent or the entire world.

BRIEF DESCRIPTION OF THE DRAWINGS

The present invention is now to be further described with reference to the drawings in which.

DETAILED DESCRIPTION OF THE INVENTION

Figure 1:
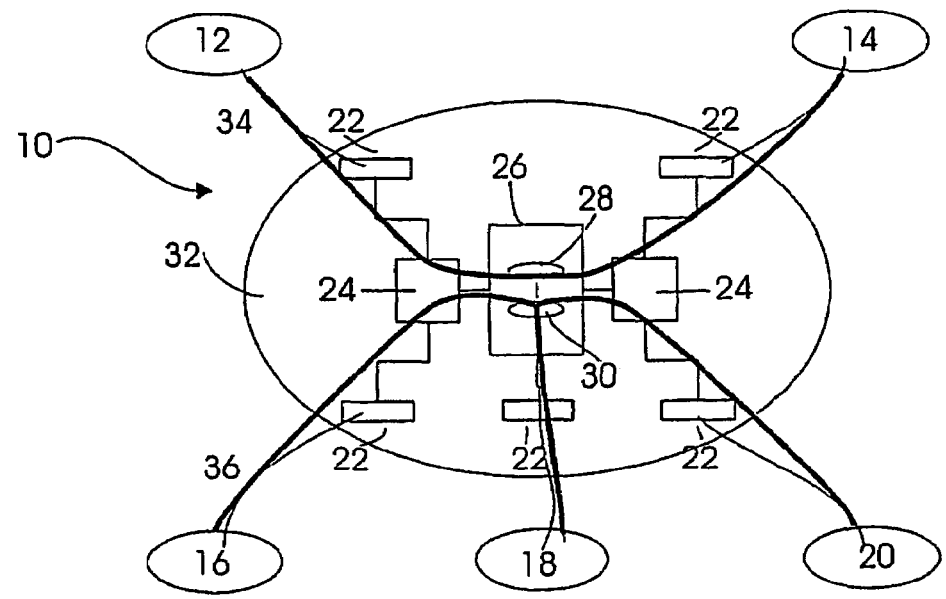
FIG. 1 illustrates a data communication system comprising a virtual Ethernet switch according to the present invention.

In FIG. 1 a data communication system designated the reference numeral 10 comprising a virtual Ethernet switch 26 is illustrated.

FIG. 1 illustrates a set-up where two separate private lines, such as Label Switch Paths, LSPs, of data communication are set-up, the communication lines are designated the reference numerals 34 and 36. The first LSP 34 connects two local area networks (LANs) 12 and 14.

The data traffic from LAN 12 passes through a gate 22. This gate 22 is connected in some way to a MPSL switch 24, which performs a statistical multiplexing of the ingress data traffic. The MPLS switch sends the data traffic into a MPLS/Ethernet switch 26.

The MPLS/Ethernet switch 26 includes one virtual Ethernet switch for each private line of communication, here is illustrated two private lines of communication, designated the reference numerals 28 and 30. The virtual Ethernet switch distributes the data according to the address fields in the data packet. If a private line of communication comprises two LANs, such as 12 and 14, the packages are forwarded from the MPLS/Ethernet switch 26 to an MPLS switch 24 to a gate 22 connected to the LAN 12 or 14. If a private line of communication includes three or more LANs, such as illustrated by the line 36 in FIG. 1 connecting the LANs 16, 18 and 20 by a LSP. If a data path only includes one egress gate, such as the data path from the MPLS/Ethernet switch 26 to the LAN 18, a statistical multiplexing performed by a MPLS switch 24 is not needed. The underlying communication protocol may be SDH or SONET, where SDH is the digital data communication protocol used in Europe and SONET is the digital data communication protocol used in North America; alternatively another protocol may be used.

Figure 2:
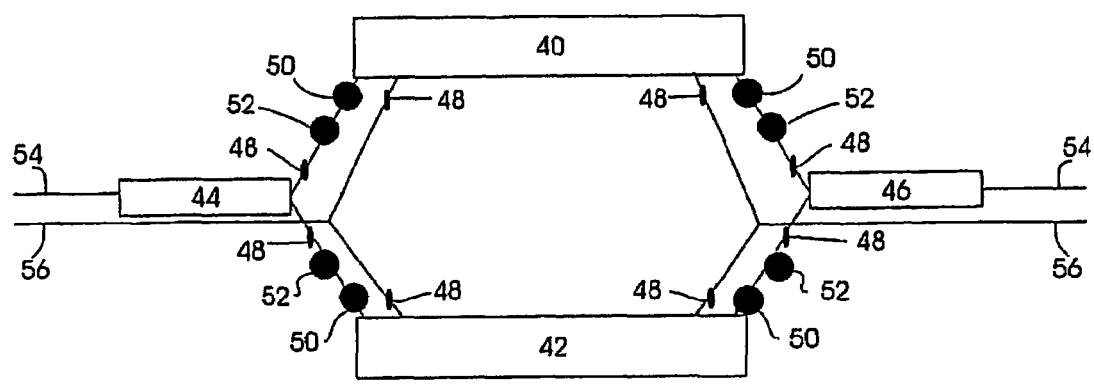
FIG. 2 illustrates a segment of a data communication system similar to the data communication system of FIG. 1.

In FIG. 2 is illustrated a segment of a data communication system similar to the data communication system of FIG. 1.

The segment illustrates the two virtual Ethernet switches 40 and 42. Further is illustrated two output queues 44 and 46 each having a gate for egress 54 data, also a gate for egress data 56 is shown. Each gate may be a SDH VCG or a physical Ethernet gate. Each gate having a counter 48. Each egress LSP having a policing module 50 and a RED module 52 monitors the traffic from the virtual Ethernet switches 40 and 42.

In one embodiment of the present invention combining MPLS and Ethernet MAC switching gives the possibility of marking a company's private Ethernet packages at the entrance of the global operator network. An LSP path can be brought through an MPLS network using Synchronous Digital Hierarchy (SDH) or Synchronous Optical Network (SONET) as transport protocol ending in an Ethernet switch where the LSP is used as logical switch gate at the company's virtual Ethernet switch. The MPLS label at the top of the package enables the service provider to separate multiple companies' Ethernet traffic even though the packages arrive in the same physical gate and the separation is also possible even if the package is to be switched into the same physical Ethernet switch. This enables a plurality of companies to be connected to one physical unit, each having a virtual Ethernet MAC switch.

The system described above combines Ethernet MAC switching technology with MPLS technology, thereby obtaining an Ethernet MAC switch switching between LSPs as opposed to traditional Ethernet MAC switches switching between physical Ethernet gates. The LSPs may carry Ethernet packages over SDH or SONET from one company network to a company network at a different location. The private Ethernet traffic of one company will not be mixed up with the private Ethernet traffic of another company because the MPLS label is used in the Ethernet switch as customer identification such that the MAC address lookup will be a combination of customer identification and MAC address, if necessary an Ethernet VLAN field, thereby making the address look a unique address, even if two companies are using the same Ethernet MAC address and/or VLAN address. From the edge of the operator network and into the physical Ethernet switch, the operator may perform statistical multiplexing of multiple LSPs from different clients.

In a second embodiment of the present invention an Ethernet switch having a large number of virtual Ethernet switches, as defined in the first embodiment above, a need for prioritizing the traffic from different customers is required, such that in case of congestion it is possible to select which packages are to be discarded. By implementing the terms policing, shaping and red as defined by IETF in the virtual Ethernet MAC switch, it is possible to police and mark packages internally in the Ethernet switch such that each customer may be guarantied a minimum bandwidth and still allowing bursts in the Ethernet traffic.

Burst traffic will be internally marked and in case of congestion, these are discarded.

Red measures the length of an output queue to a gate and in case of overload or congestion will discard the packages marked red.

This system implements known principles defined by IETF combined with MPLS and Ethernet switching as described in the first embodiment of the present invention described above.

The invention claimed is:

1. A method of sending an information package from a first data network to at least one second data network through a communications network, selected from a group consisting of a SDH and a SONET network, said communications network comprising a first plurality of access points and a second plurality of MPLS switches, a third plurality of paths defined from each of said access points to an Ethernet switch including MPLS switching capabilities via at least one of the first plurality of MPLS switches, a fourth plurality of paths defined from said Ethernet switch including MPLS switching capabilities to each of said access points via at least one of the second plurality of MPLS switches, said method comprising:

sending said information package from said first network to a specific access point of said first plurality, wherein said communications network comprises a SDH and a SONET network, receiving said information package at said specific access point and adding a header to said information package, said header including an MPLS label, sending said information package including said header from said specific access point to said Ethernet switch including MPLS switching capabilities via a path of said third plurality, said Ethernet switch including MPLS switching capabilities switching said information package including said header to at least one of said paths of said fourth plurality, receiving said information package including said header at at least one further specific access point corresponding to said at least one second data network, removing said header from said information package, and sending said information package from said at least one further specific access point to said at least one second data network.

2. The method according to claim 1, wherein said information package is an Ethernet package.

3. The method according to claim 1, wherein at least one of said first data network and said second data network is an Ethernet network.

4. The method according to claim 1, wherein said information package includes an Ethernet VLAN field, said Ethernet switch including MPLS switching capabilities reading said VLAN field.

5. The method according to claim 1, wherein said Ethernet switch including MPLS switching capabilities further includes software or hardware implementations of policing according to IETF specifications.

6. The method according to claim 1, wherein said Ethernet switch including MPLS switching capabilities further includes software or hardware implementations of shaping according to IETF specifications.

7. The method according to claim 1, wherein said Ethernet switch including MPLS switching capabilities further includes software or hardware implementations of red according to IETF specifications.

* * * * *